No. 862,285. PATENTED AUG. 6, 1907.
C. R. SCHMIDT.
METHOD OF ENAMELING.
APPLICATION FILED DEC. 14, 1906.

WITNESSES: INVENTOR
Charles R. Schmidt
BY
Connolly Bros.
Attorneys

UNITED STATES PATENT OFFICE.

CHARLES R. SCHMIDT, OF BALTIMORE, MARYLAND.

METHOD OF ENAMELING.

No. 862,285.　　　　　Specification of Letters Patent.　　　　　Patented Aug. 6, 1907.

Application filed December 14, 1906. Serial No. 347,859.

*To all whom it may concern:*

Be it known that I, CHARLES R. SCHMIDT, a citizen of the United States, residing at Baltimore, in the State of Maryland, have invented certain new and useful Improvements in Methods of Enameling, of which the following is a specification.

This invention has relation to methods of enameling, and relates in particular to methods of enameling hollow cylindrical bodies of iron, such as tubes or pipes.

The object of my invention is to provide a novel method whereby iron tubes, pipes, or similar hollow cylindrical bodies may be rapidly and evenly coated with suitable enameling material and the latter fused onto the tube, pipe or other body without the aid of skilled labor and without employing the manually operated distributing sieves or screens and enameling tables ordinarily employed.

In carrying my method into effect, I provide a cylindrical rotary enameling chamber or muffle conforming generally in shape to the article to be enameled and place such article, while in a highly heated condition, in the rotary enameling chamber or muffle together with a sufficient quantity of suitable enameling material fusible at a comparatively low temperature and then rotate the enameling chamber or muffle, and thereby impart rotary movement to the article and, the enameling chamber being formed with longitudinally disposed ribs, forming longitudinally disposed pockets, cause the enameling material to be rapidly and evenly distributed over the surface of the article, upon which it is fused by the heat emanating therefrom.

Figure 1:
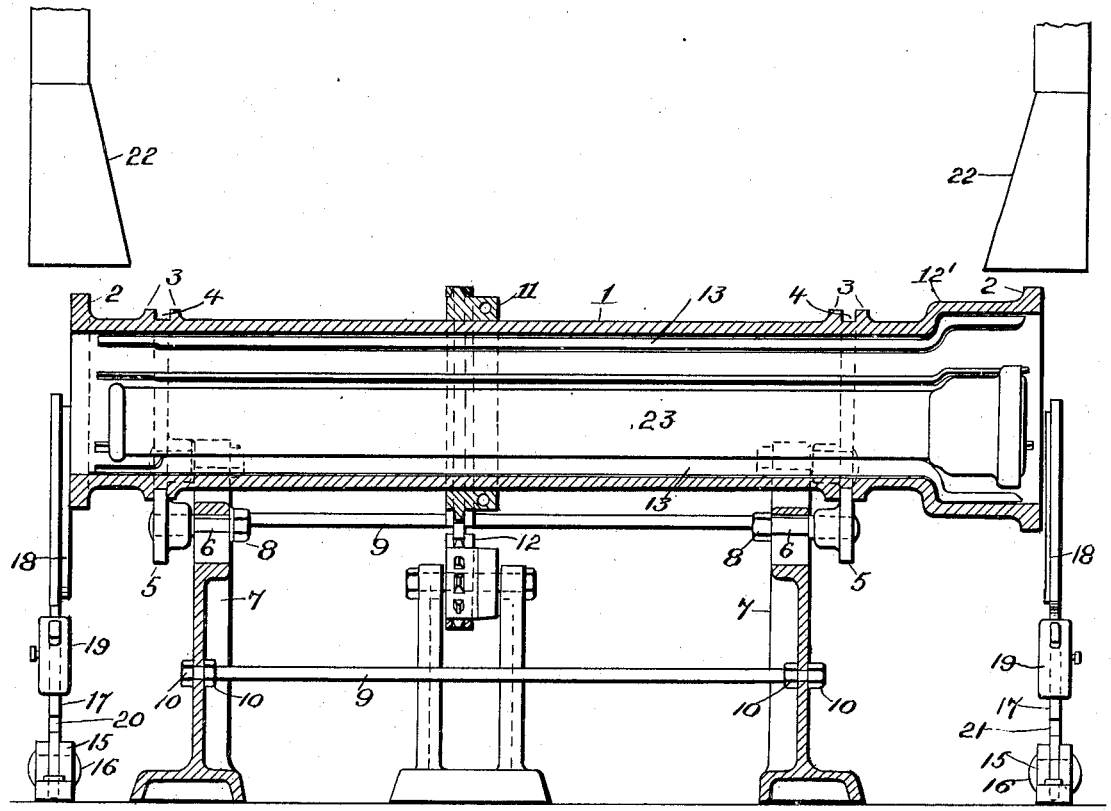
Figures 2, 3:
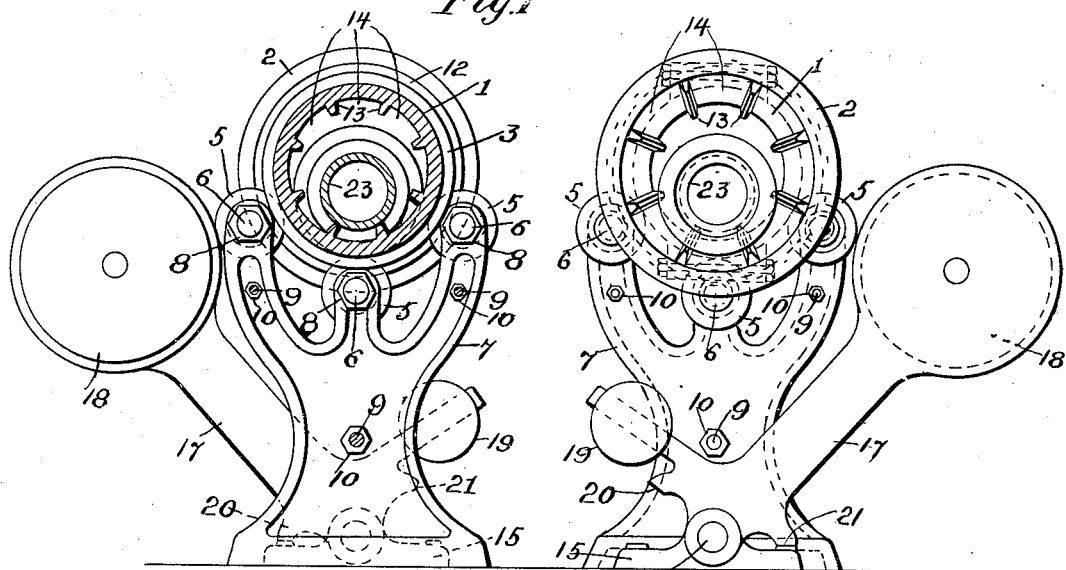

I have illustrated an apparatus adapted to carry out my method in the accompanying drawing wherein:

Figure 1, is a vertical longitudinal sectional view of an enameling chamber or muffle containing a section of tube or pipe. Fig. 2 is a vertical transverse sectional view of the same. Fig. 3 is an end elevation of the same.

The enameling chamber or muffle, designated 1, is composed of a cylindrical section of metal having at each end a flange 2 and near each end two circumferential ribs 3, 3, each pair of ribs having an intervening groove 4, which grooves constitute ways or tracks for supporting wheels 5. The wheels 5 are journaled on bolts 6 so as to turn loosely thereon and the bolts 6 are secured in frames 7, 7, by means of nuts 8, while the frames are connected together by the rods 9 having nuts 10, 10 at each end. The frames 7, 7, are of substantially "Y" shape and the wheels 5 are so disposed on the frame as to firmly support the enameling chamber at its vertical central line and at both sides just below its horizontal central line.

The enameling chamber or muffle 1, carries a sprocket wheel 11 disposed between the frames 7, 7, around which an endless chain 12 is passed and by means of which rotary motion is communicated to the enameling chamber or muffle, from any suitable source of power.

One end of the enameling chamber or muffle 1 is formed with a bell 12', corresponding in shape to the bell end of an ordinary cast-iron pipe and within the enameling chamber or muffle and extending substantially from end to end thereof are a number of longitudinally disposed ribs 13 which are preferably formed integral with the body of the enameling chamber or muffle, the spaces between these ribs forming pockets 14 for the reception of the enameling material, as will be hereinafter described.

Upon the ground or floor and below each end of the enameling chamber or muffle 1, is arranged a base 15 in which is pivotally supported by means of a stub shaft 16 an "L" shaped arm 17 that carries on its upper end a door 18 adapted, when the arm is in a vertical position, to close the end of the enameling chamber or muffle and when the arm is at an angular position, to clear the end of the enameling chamber or muffle. The arms 17 have each an adjustable counterweight 19 on its lateral extension, these weights serving to hold the doors in closed position, stops 20, 21 being formed on each arm to contact with the base 15 and limit the movement of the arm in each direction.

Hoods 22, 22 are arranged above the ends of the enameling chamber to carry off dust and fumes.

The operation of the above described apparatus when employed in carrying out my method, is as follows: The enameling material, which should be in a dry granular or powdered condition and which should be fusible at a comparatively low temperature, is introduced into the enameling chamber or muffle 1 and distributed along the bottom of the same from end to end. The article to be enameled, for instance an iron pipe 23; is heated to a high degree and while so heated is introduced into the enameling chamber and laid on the ribs at the bottom and the arms 17 are swung up to a vertical position so that the doors 18 will come in front of and thereby close the ends of the enameling chamber or muffle. Rotary movement is then imparted to the enameling chamber or muffle through the medium of chain 12 and as the enameling chamber rotates the article 23 rolls or rotates within the enameling chamber or muffle. The enameling material is carried up and around by the ribs 13 and discharged upon the article 23 and, as the latter is being, as before described, continuously rotated, the enamel will be evenly distributed all over the surface of the article, upon which it will fuse by the heat imparted to it by the article and to which it will adhere in the form of a smooth and regular coating of enamel of even thickness throughout.

If desired the interior of the article 23, where such article is hollow, may be enameled simultaneously with the enameling of the external surface of the same by placing a quantity of dry enameling material within the article, which material will be distributed around the inner wall of the article by the rotary movement of the article and be fused thereon simultaneously with the fusing of the enameling material on the external surface thereof.

I claim:

1. The method of enameling, which consists in heating the article to be enameled, inclosing the same in a rotary enameling chamber or muffle containing dry enameling material, rotating the enameling chamber or muffle and simultaneously rotating the article.

2. The method of enameling cylindrical articles consisting in heating the article, supporting the article in rotatable position, continuously rotating the same so as to successively bring each part of its external surface uppermost and depositing enameling material on such heated external surface.

3. The method of enameling consisting in heating the article to be enameled, inclosing the same in a closed unheated enameling chamber or muffle containing dry enameling powder and simultaneously rotating the enameling chamber or muffle and the article.

4. The method of enameling hollow cylindrical articles on their inner and outer surfaces simultaneously, consisting in heating the article, placing enameling material within the same, rotating the article and while the article is rotating, depositing enameling material on the outer surface thereof.

In testimony whereof I have affixed my signature, in presence of two witnesses.

CHARLES R. SCHMIDT.

Witnesses:
THOS. A. CONNOLLY,
JOS. B. CONNOLLY.